United States Patent
Birch et al.

(10) Patent No.: US 11,722,445 B2
(45) Date of Patent: Aug. 8, 2023

(54) MULTI-COMPUTER SYSTEM FOR DETECTING AND CONTROLLING MALICIOUS EMAIL

(71) Applicant: Bank of America Corporation, Charlotte, NC (US)

(72) Inventors: Christopher D. Birch, Tega Cay, SC (US); Guy Vernon Pearson, Jr., Columbia, MD (US); James R. Crocker, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/111,249

(22) Filed: Dec. 3, 2020

(65) Prior Publication Data
US 2022/0182345 A1 Jun. 9, 2022

(51) Int. Cl.
*H04L 51/212* (2022.01)
*H04L 51/08* (2022.01)
*H04L 9/40* (2022.01)
*H04L 51/48* (2022.01)
*H04L 51/214* (2022.01)
*H04L 61/4511* (2022.01)

(52) U.S. Cl.
CPC ............ *H04L 51/212* (2022.05); *H04L 51/08* (2013.01); *H04L 51/214* (2022.05); *H04L 51/48* (2022.05); *H04L 61/4511* (2022.05); *H04L 63/1433* (2013.01)

(58) Field of Classification Search
CPC ......... H04L 51/12; H04L 51/08; H04L 51/14; H04L 51/28; H04L 61/1511; H04L 63/1433
See application file for complete search history.

(56) References Cited

U.S. PATENT DOCUMENTS

| 9,838,407 B1 | 12/2017 | Oprea et al. |
| 9,922,124 B2 | 3/2018 | Rathod |
| 10,382,469 B2 | 8/2019 | Adams et al. |

(Continued)

OTHER PUBLICATIONS

Shelley, S., "Eliminating the threat of look-alike domains," Security Boulevard, Oct. 20, 2020, retrieved Dec. 3, 2020, from <https://securityboulevard.com/2020/10/eliminating-the-threat-of-look-alike-domains/>, 4 pages.

*Primary Examiner* — Austin J Moreau
(74) *Attorney, Agent, or Firm* — Banner & Witcott, Ltd.

(57) ABSTRACT

Aspects of the disclosure relate to identifying and processing suspicious emails. In some embodiments, a computing device may receive an email associated with an email domain. Subsequently, the computing device may determine a registration date of the email domain. The computing device may then compare the determined registration date to a first threshold date. Thereafter, responsive to determining that the determined registration date is before the first threshold date, the computing device may transmit the email to a recipient address identified in the email. Responsive to determining that the determined registration date is at or after the first threshold date, the computing device may execute a security risk assessment model. The computing device may then determine, based on the security risk assessment model, a security risk level of the email domain. The computing device may filter, based on the security risk level of the email domain, the email.

20 Claims, 8 Drawing Sheets

(56) References Cited

U.S. PATENT DOCUMENTS

| | | | |
|---|---|---|---|
| 10,574,681 B2 | 2/2020 | Meshi et al. | |
| 10,721,255 B2 | 7/2020 | Wang et al. | |
| 2005/0283519 A1* | 12/2005 | Turgeman | H04L 51/12 715/255 |
| 2006/0026242 A1* | 2/2006 | Kuhlmann | H04L 51/12 709/206 |
| 2006/0200487 A1* | 9/2006 | Adelman | G06Q 10/107 707/999.102 |
| 2009/0006569 A1* | 1/2009 | Morss | H04L 63/145 709/206 |
| 2014/0331318 A1* | 11/2014 | Windsor | H04L 51/04 726/22 |
| 2018/0077120 A1* | 3/2018 | Baughman | H04L 67/563 |
| 2018/0314762 A1 | 11/2018 | Rathod | |
| 2020/0280530 A1* | 9/2020 | Kessler | H04L 47/50 |
| 2020/0287913 A1 | 9/2020 | Buck | |
| 2020/0374669 A1 | 11/2020 | Waytena et al. | |
| 2020/0377233 A1 | 12/2020 | Harvey et al. | |
| 2020/0379660 A1 | 12/2020 | Ciudad et al. | |
| 2020/0379726 A1 | 12/2020 | Blatz et al. | |
| 2020/0379727 A1 | 12/2020 | Blatz et al. | |
| 2020/0380003 A1 | 12/2020 | Abbasi Moghaddam et al. | |
| 2020/0380208 A1 | 12/2020 | Garcia, III et al. | |
| 2020/0380389 A1 | 12/2020 | Eldeeb et al. | |
| 2020/0380408 A1 | 12/2020 | Sridhar et al. | |
| 2020/0380499 A1 | 12/2020 | Laracey | |
| 2020/0380513 A1 | 12/2020 | Phillips et al. | |
| 2020/0380956 A1 | 12/2020 | Rossi et al. | |
| 2020/0380963 A1 | 12/2020 | Chappidi et al. | |
| 2020/0380973 A1 | 12/2020 | Novitchenko et al. | |
| 2020/0380980 A1 | 12/2020 | Shum et al. | |
| 2020/0380983 A1 | 12/2020 | Sundaram et al. | |
| 2020/0380996 A1 | 12/2020 | Alsina et al. | |
| 2020/0382323 A1 | 12/2020 | Keselman et al. | |
| 2020/0382480 A1 | 12/2020 | Isaacson et al. | |
| 2020/0382496 A9 | 12/2020 | Thirumavalavan | |
| 2020/0382501 A1 | 12/2020 | Van Der Velden | |
| 2020/0382513 A1 | 12/2020 | Biswas et al. | |
| 2020/0382517 A1 | 12/2020 | Alsina | |
| 2020/0382559 A1 | 12/2020 | Kramar et al. | |
| 2020/0382822 A1 | 12/2020 | Ramaswamy et al. | |

* cited by examiner

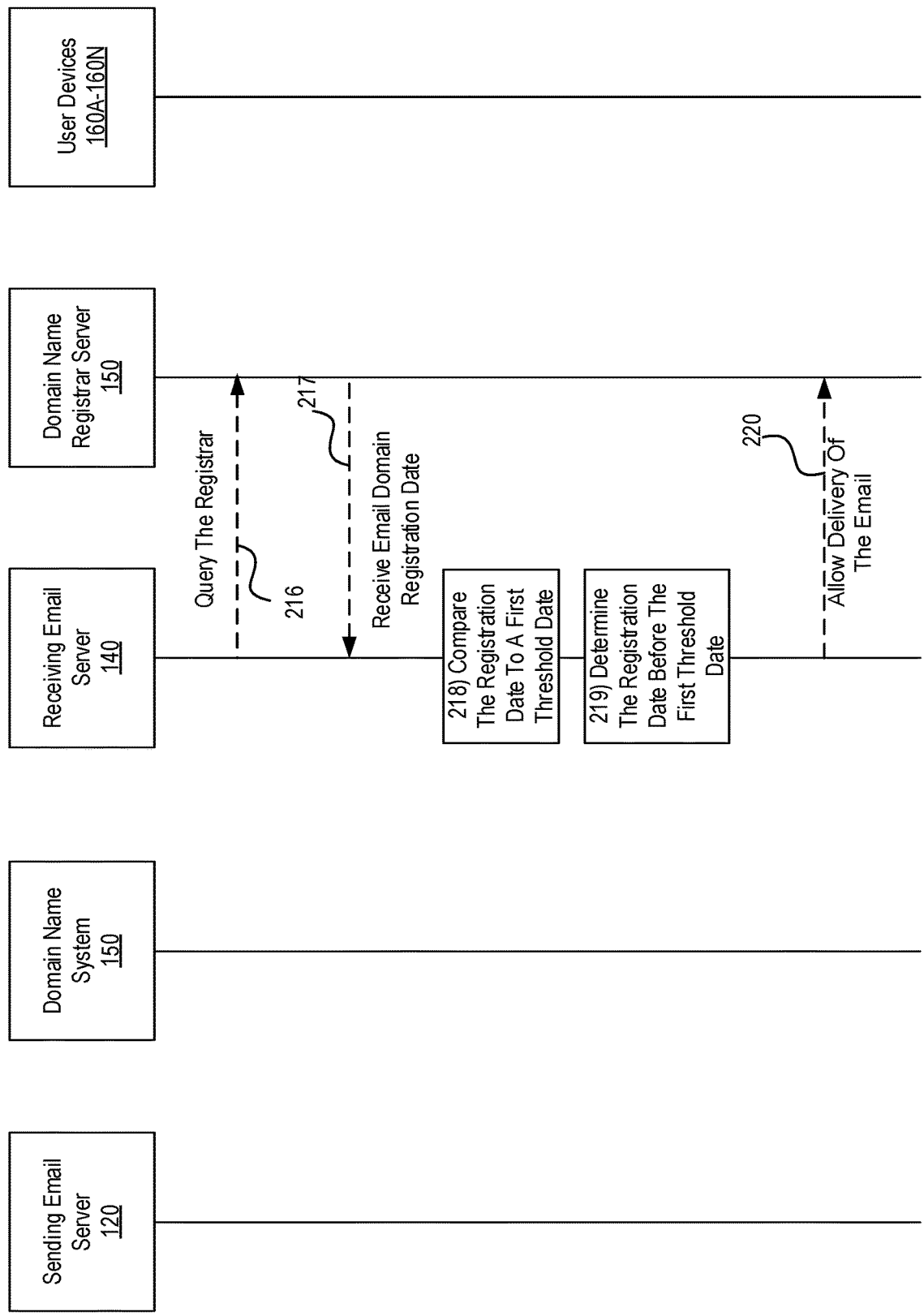

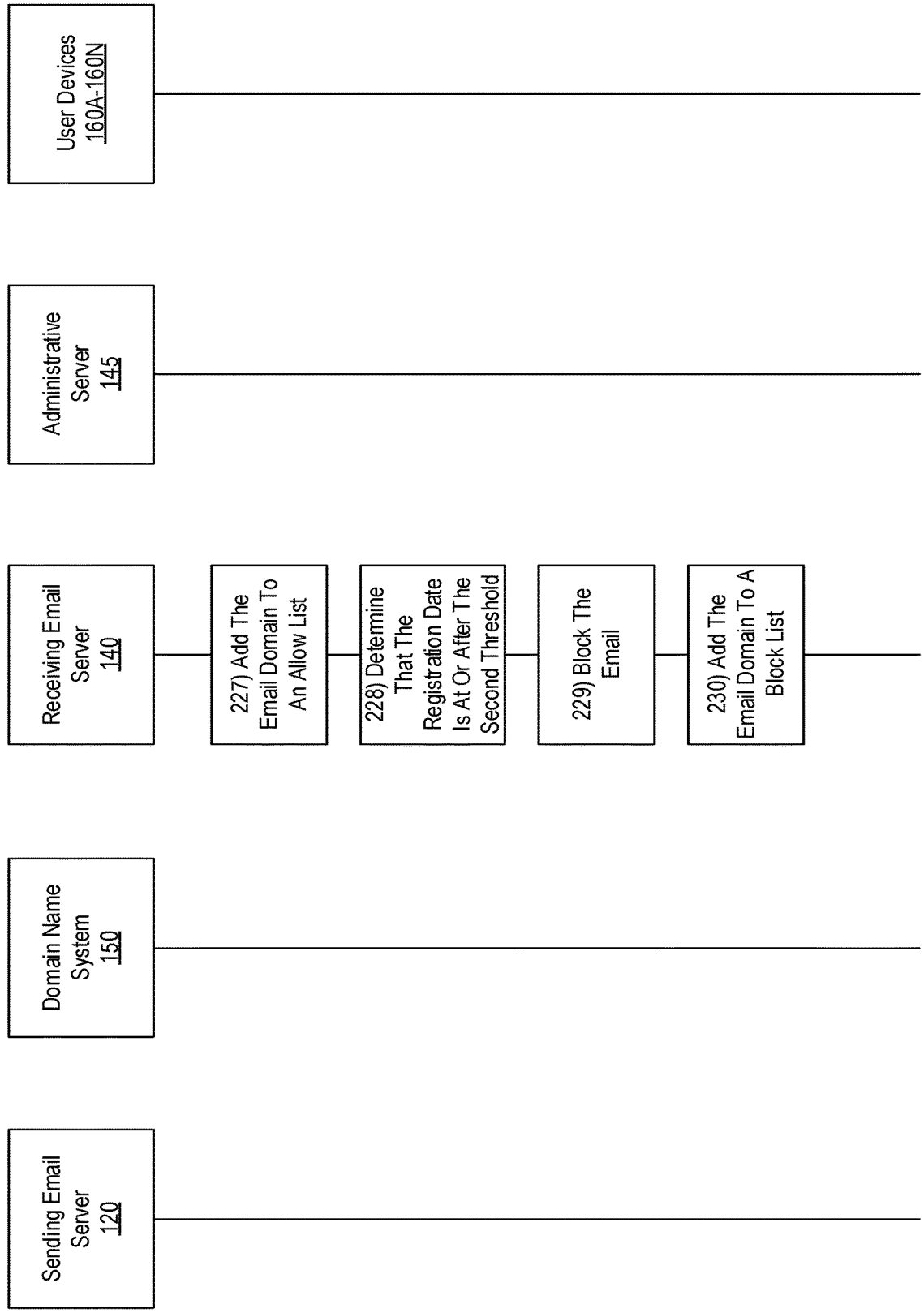

MULTI-COMPUTER SYSTEM FOR DETECTING AND CONTROLLING MALICIOUS EMAIL

FIELD

Aspects of the disclosure relate to computers, networking, hardware, and software. In particular, one or more aspects of the disclosure relate to identifying and processing suspicious emails based on email domains.

BACKGROUND

Spam and phishing emails often target users with look-alike email domains. Companies have been using different tools to identify potential unauthorized or malicious emails and prevent emails from being transmitted to their employees. However, these tools are often ineffective and time-consuming, and may require companies to purchase additional software. For example, companies routinely use a variety of algorithms to categorize incoming emails to identify spam and phishing emails. Unfortunately, this often incorrectly puts legitimate emails into the wrong categories and prevents user access. It is important for companies to ensure unauthorized or malicious emails are easily and accurately identified before transmitting to the recipients. In many cases, however, it may be difficult to easily and accurately identify and block unauthorized or malicious emails.

SUMMARY

Aspects of the disclosure provide effective, efficient, scalable, and convenient technical solutions that address and overcome the technical problems associated with accurately and quickly identifying and processing suspicious emails.

In accordance with one or more embodiments, a computing device having at least one processor and memory may receive an email associated with an email domain. Subsequently, the computing device may determine a registration date of the email domain. The computing device may then compare the determined registration date to a first threshold date. Thereafter, responsive to determining that the determined registration date is before the first threshold date, the computing device may transmit the email to a recipient address identified in the email. Responsive to determining that the determined registration date is at or after the first threshold date, the computing device may execute a security risk assessment model. The computing device may then determine, based on the security risk assessment model, a security risk level of the email domain. The computing device may filter, based on the security risk level of the email domain, the email.

In some examples, the security risk assessment model may comprise information indicating a relation between the registration date and the security risk level of the email domain.

In some embodiments, the filtering the email may comprise preventing the email from being transmitted to the recipient address identified in the email.

In some embodiments, the filtering the email may comprise redirecting, based on the security risk level of the email domain, the email to an administrator email address for further determination of a security risk of the email. In some arrangements, responsive to determining that the email is associated with a low security risk, the computing device may permit or enable delivery of the email to a recipient address identified in the email.

In some arrangements, the computing device may add, based on the security risk level of the email domain, the email domain to a block list, and automatically block (e.g., prevent from delivery to the intended recipient, to any recipient, or the like) emails associated email domains included in the block list.

In some embodiments, determining the registration date of the email domain may comprise querying a domain name registrar for the registration date of the email domain and receiving the registration date of the email domain from the domain name registrar.

In some example arrangements, the determining the registration date may be performed upon receiving the email.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for identifying and processing suspicious emails based on email domains and/or email domain registration date in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the present disclosure describe identifying and processing suspicious emails based on email domains and executing a security risk model to filter the emails.

Figure 1A:
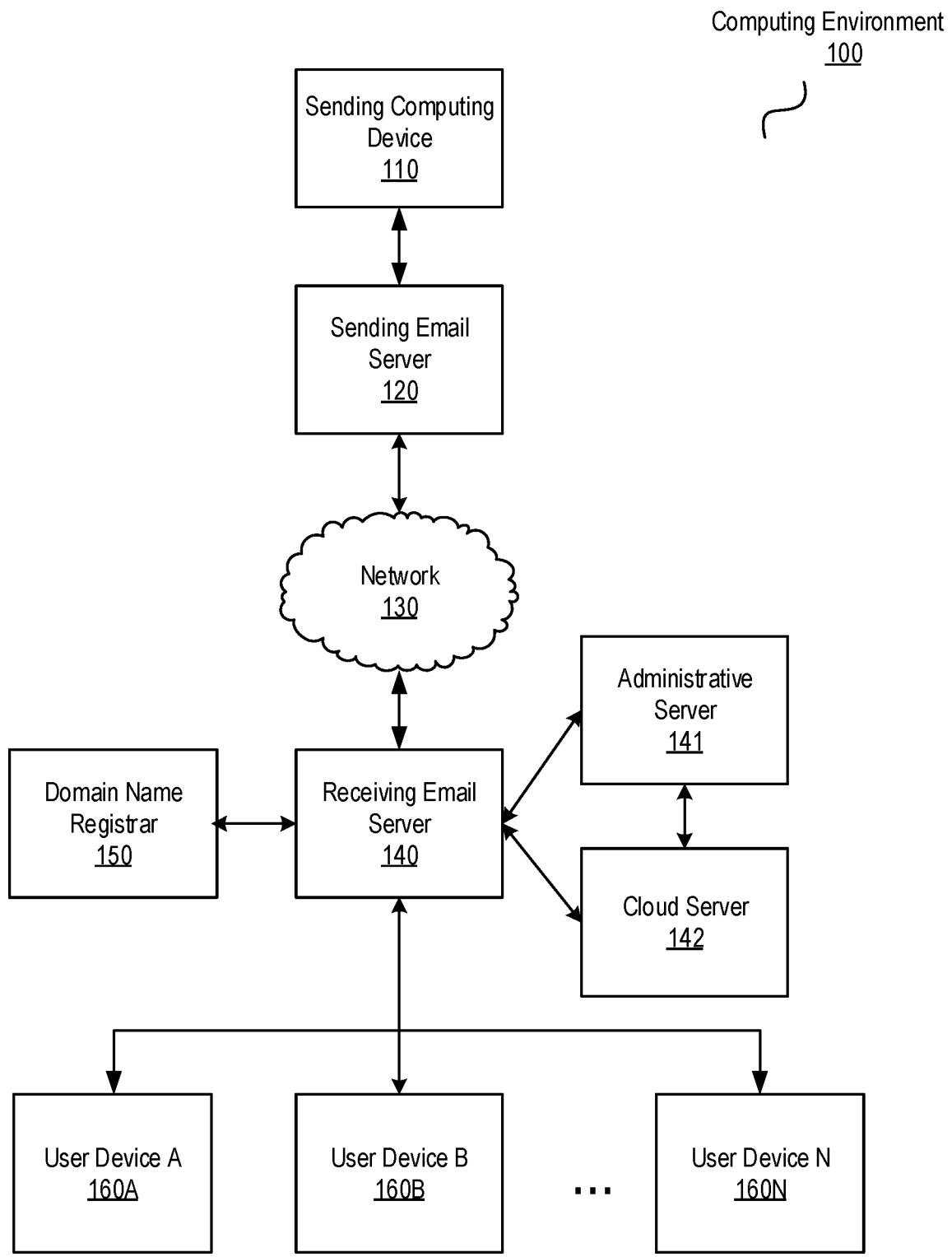
FIGS. 1A and 1B depict an illustrative computing environment for identifying and processing suspicious emails based on email domains and/or email domain registration date in accordance with one or more example embodiments.
Figure 1B:
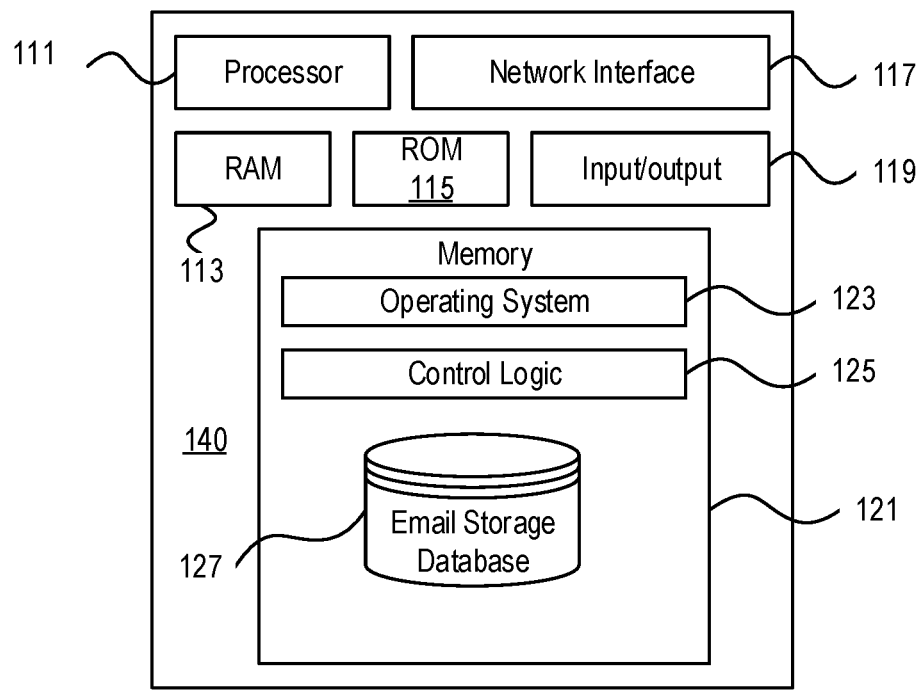

FIGS. 1A and 1B depict an illustrative computing environment for identifying and processing suspicious emails based on email domains and/or email domain date in accordance with one or more example embodiments. Referring to FIG. 1A, a computing environment 100 may include one or more computing devices, servers, and systems. For example, computing environment 100 may comprise a sending computing device 110, a sending email server 120, a receiving email server 140, an administrative server 141, a cloud server 142, a domain name registrar server 150, and user devices 160A-160N.

Sending computing device 110 may comprise one or more computing devices and/or other computer components (e.g., processors, memories, communication interfaces). Sending computing device 110 may register (e.g., purchase) a domain name for setting up one or more email accounts that use the registered domain name. For example, sending computing device 110 may search a legitimate domain name and register a similar domain name (e.g., a domain name that may be easily misconstrued as the legitimate domain name because it, for instance, has one additional letter or number, has one less letter or number, transposes two letters or numbers, or the like). Sending computing device 110 may then send emails using the registered similar domain name.

Sending email server 120 may comprise one or more computing devices and/or other computer components (e.g., processors, memories, communication interfaces). Sending email server 120 may be an outgoing simple mail transfer protocol (SMTP) server that receives emails from sending computing device 110 and processes the emails based on the SMTP. For example, sending email server 120 may recognize that the received emails comprise information indicating that the recipient's domain name is not the same as the sender's email domain. Sending email server 120 may then communicate with a domain name system (DNS) or another domain name server. For example, sending email server 120 may query the DNS for the recipient's address (e.g., Internet Protocol (IP) address). The DNS may be a server that stores information (e.g., IP addresses) associated with domain names. For example, the DNS may send a response to sending email server 120 and provide the recipient's IP address. Sending email server 120 may then route the emails to another email server (e.g., receiving email server 140) based on the SMTP and the recipient's address. Sending email server 120 may store the emails that it has received.

As illustrated in greater detail below, receiving email server 140 may include one or more computing devices configured to perform one or more of the functions described herein. For example, receiving email server 140 may include one or more computing devices and/or other computer components (e.g., processors, memories, communication interfaces). Receiving email server 140 may receive emails sent from sending email server 120 and send the emails to one or more local or remote devices (e.g., user devices 160A-160N). In addition, and as illustrated in greater detail below, receiving email server 140 may be configured to determine the security risk of the incoming emails and perform corresponding actions based on the security risk of the incoming emails.

Domain name registrar server 150 may comprise one or more computing devices and/or other computer components (e.g., processors, memories, communication interfaces). Examples of domain name registrar server 150 may relate to one or more of domain.com, namecheap.com, or whois.net. Domain name registrar server 150 may be managed by one or more companies. Domain name registrar server 150 may also communicate with or exchange information with the DNS. Domain name registrar server 150 may be responsible for the registration and transfer of domain names. Domain name registrar server 150 may be managed and/or supervised by the Internet Corporation for Assigned Names and Numbers (ICANN). For example, ICANN may assign a set of domain names to domain name registrar server 150. Receiving email server 140 may query and obtain the registration dates of the email domains from domain name registrar server 150 or through ICANN (e.g., ICANN lookup). As illustrated in greater detail below, receiving email server 140 may query or otherwise exchange information with one or more domain name registrar servers (e.g., domain name registrar server 150) for one or more registration dates of incoming email domains.

Receiving email server 140 may be implemented in a cloud-based environment and/or communicate with a cloud server for the query of one or more registration dates. For example, cloud server 142 may be used to facilitate the query for the one or more registration dates so that high-volume incoming emails may be efficiently processed. Cloud server 142 may include one or more computing devices and/or other computer components (e.g., processors, memories, communication interfaces). Cloud server 142 may be a private (e.g., enterprise) cloud, a hybrid cloud, and/or a public cloud. Cloud server 142 may comprise one or more databases that store the email domain names and related information. For example, the databases may store an allow list that comprises legitimate domain names and a block list that comprises potential unauthorized or malicious domain names. Cloud server 142 may communicate with receiving email server 140 and/or administrative server 141 for the processing of the emails. Additionally or alternatively, cloud server 142 may use anti-spam techniques to determine the security risk of emails.

Administrative server 141 may include one or more computing devices and/or other computer components (e.g., processors, memories, communication interfaces). In addition, administrative server 141 may be configured to receive information from, send information to, and/or otherwise exchange information with receiving email server 140, cloud server 142, and user devices (160A-160N). Administrative server 141 may be managed or controlled by one or more network administrators.

User devices 160A-160N may include one or more computing devices and/or other computer components (e.g., processors, memories, communication interfaces). For example, one or more user devices 160A-160N may be a mobile computing device (e.g., smartphone, tablet, smart watch, laptop computer, or the like) or desktop computing device (e.g., desktop computer, terminal, or the like). In addition, one or more user devices 160A-160N may be linked to and/or used by one or more users. One or more user devices 160A-160N may be capable of receiving and/or displaying a user interface, email, or the like, receiving or sending input via the user interface, and communicating the received input to one or more other computing devices. One or more user devices 160A-160N may use the user interface to communicate with administrative server 141 and/or receiving email server 140 via a network. One or more user devices 160A-160N may be able to access one or more applications (e.g., email applications, SaaS applications) provided by receiving email server 140 or cloud server 142.

Computing environment 100 also may include one or more networks 130, which may interconnect one or more of sending computing device 110, sending email server 120, receiving email server 140, domain name registrar server 150, administrative server 141, cloud server 142, user devices 160A-160N, and/or one or more other systems which may be associated with receiving email server 140, with one or more other systems, public networks, sub-networks, and/or the like. The one or more networks 130 may be Internet. Other networks, including private intranets, corporate networks, local area networks (LAN), wide area networks (WAN), metropolitan area networks (MAN), wireless networks, personal networks (PAN), may also or alternatively be used. For example, receiving email server 140 may connect with user devices 160A-160N via one or more corporate networks or local area networks (LAN).

In one or more arrangements, sending computing device 110, sending email server 120, receiving email server 140, domain name registrar server 150, administrative server 141, cloud server 142, user devices 160A-160N may be any type of computing device capable of receiving and/or displaying a user interface, email, or the like, receiving input via the user interface, and communicating the received input to one or more other computing devices. As noted above, and as illustrated in greater detail below, one or more of sending computing device 110, sending email server 120, receiving email server 140, domain name registrar server 150, administrative server 141, cloud server 142, or user devices 160A-160N may, in some instances, be special-purpose computing devices configured to perform specific functions.

As illustrated in greater detail below, some aspects of the disclosure may provide technical benefits that are not provided by conventional systems. For example, one or more aspects of the disclosure may easily and accurately identify potential unauthorized or malicious emails based on simple indicators such as registration dates of email domains. In another example, one or more aspects of the disclosure may provide automated email filtering and scoring functionality to control delivery or distribution of identified unauthorized or malicious emails. In still other examples, one or more aspects may provide automated unauthorized or malicious email identification functionality, improve technical operations and efficiency of the delivery of emails, analyze and process high-volume incoming emails, and significantly reduce the manual intervention needed to review and filter incoming emails. Various other technical benefits may be achieved as well.

Referring to FIG. 1B, receiving email server 140 may include one or more processor(s) 111, RAM 113, ROM 115, a communication interface 117, an input/output (I/O) module 119 (e.g., mouse, keyboard, display, printer), and memory(s) 121. Communication interface 117 may be a network interface configured to support communication between receiving email server 140 and one or more networks (e.g., network 130). Memory 121 may include control logic 125 having instructions that when executed by processor 111 cause receiving email server 140 to perform one or more functions described herein and/or one or more databases to store and/or otherwise maintain information which may be used by such program modules and/or processor 111. Functionality of receiving email server 140 may refer to operations or decisions made automatically based on rules coded into control logic 125, made manually by a user (e.g., an administrator) providing input into the system, and/or a combination of automatic processing and user input. The various hardware memory units in memory 121 may include volatile and nonvolatile, removable and non-removable media implemented in any method or technology for storage of information such as computer-readable instructions, data structures, program modules, or other data.

In some instances, the one or more program modules and/or databases may be stored by and/or maintained in different memory units of data access on receiving email server 140 and/or by different computing devices that may form and/or otherwise make up receiving email server 140. For example, memory 121 may comprise an operating system 123, control logic 125, and one or more email storage databases 127. The operating system 123 may control the overall operation of receiving email server 140. The one or more email storage databases 127 may store information related to the incoming emails and outgoing emails. For example, one or more email storage databases 127 may store the registration dates of the domains of the incoming emails. In some embodiments, the information stored in memory 121 may be stored in a single database, or separated into different logical, virtual, or physical databases, depending on system design.

Figure 2A:
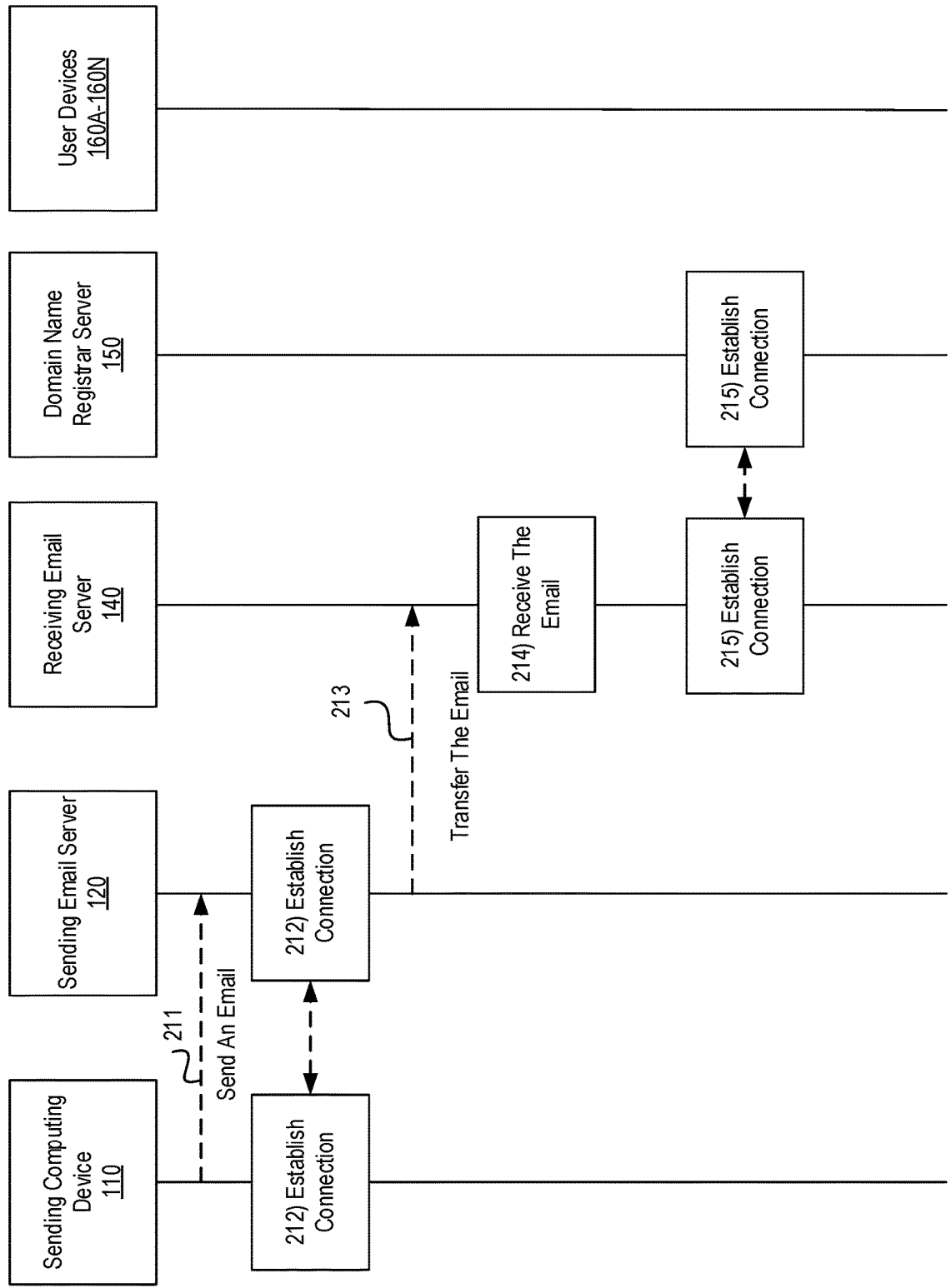

FIGS. 2A-2D depict an illustrative event sequence for identifying and processing suspicious emails based on email domains in accordance with one or more example embodiments. Referring to FIG. 2A, at step 211, sending computing device 110 may initiate sending an email to a recipient. The email may be associated with an email domain name and the recipient's email address. At step 212, sending computing device 110 may establish a connection with sending email server 120. For example, sending computing device 110 may establish a wireless data connection with sending email server 120 to link sending computing device 110 to sending email server 120. In some instances, sending computing device 110 may identify whether or not a connection is already established with sending email server 120. If a connection is already established with sending email server 120, sending computing device 110 might not re-establish the connection. If a connection is not already established, sending computing device 110 may establish the wireless data connection as described herein. After the connection is established, a communication session may be initated between sending computing device 110 and sending email server 120.

Sending email server 120 may receive the email sent from sending computing device 110 via a network. For example, sending email server 120 may receive the email via the communication session initiated upon establishing the connection between sending computing device 110 and sending email server 120.

At step 213, sending email server 120 may initiate transfer of the email to the recipient. In order to obtain an IP address associated with the recipient's email address, sending email server 120 may query the DNS for the IP address associated with the recipient's email address and route the email to receiving email server 140 based on the IP address. Sending email server 120 may route the email to one or more other email servers (e.g., message transfer agents) before receiving email server 140 receives the email. The transfer of the email may be processed based on the SMTP. Sending email server 120 may store the email in its database.

At step 214, receiving email server 140 may receive the email. Receiving email server 140 may then process the email to determine whether the email is suspicious. For instance, receiving email server 140 may extract information from the email. For example, receiving email server 140 may extract the email domain name and/or content of the email from the email. The email domain name may indicate the source of the email and/or a company associated with the email. For example, an email sent from abc@xyz.com may indicate that the sender is associated with entity xyz. Receiving email server 140 may then determine whether the extracted email domain is included in an allow list of email domains. The allow list may comprise email domains that are trusted by receiving email server 140. As an example, receiving email server 140 may add an email domain to the allow list if receiving email server 140 determines that receiving email server 140 has communicated with the email domain before. As another example, receiving email server 140 may add an email domain to the allow list if receiving email server 140 determines that the email domain is associated with a legitimate company or business name. The allow list may be constantly updated by receiving email server 140. If the email domain is included in the allow list, receiving email server 140 may determine that the sender of the email can be trusted and may allow the email to be delivered to (e.g., downloaded by) the recipient. Receiving email server 140 may comprise a database (e.g., email storage database 127) that stores the allow list. If the email domain is not included in the allow list (e.g., receiving email server 140 has never received an email associated with the email domain), receiving email server 140 may use other methods to determine whether the email domain can be trusted, as illustrated in greater detail below.

Additionally or alternatively, receiving email server 140 may then determine whether the extracted email domain is included in a block list of email domains. The block list may comprise email domains that are not trusted by receiving email server 140. The block list may be constantly updated by receiving email server 140. For example, receiving email server 140 may have previously received spam and/or phishing emails and may add email domains associated with those spam and/or phishing emails to the block list. Receiving email server 140 may comprise a database (e.g., email storage database 127) that stores the block list. If the email domain is included in the block list, receiving email server 140 may determine that the sender of the email cannot be trusted and may prevent the email from being delivered to the recipient. If the email domain is not included in the block list, receiving email server 140 may use other methods to determine whether the email domain can be trusted, as illustrated in greater detail below.

At step 215, receiving email server 140 may establish a connection with domain name registrar server 150. For example, receiving email server 140 may establish a wireless data connection with domain name registrar server 150 to link receiving email server 140 to domain name registrar server 150. In some instances, receiving email server 140 may identify whether or not a connection is already established with domain name registrar server 150. If a connection is already established with domain name registrar server 150, receiving email server 140 might not re-establish the connection. If a connection is not already established, receiving email server 140 may establish the wireless data connection as described herein.

Referring to FIG. 2B, at step 216, receiving email server 140 may query domain name registrar server 150 for the registration date of the email domain. For example, receiving email server 140 may perform a search engine query on the registrar server's database based on a query and response protocol (e.g., registration data access protocol (RDAP)). The search engine query may comprise information associated with the email domain. For example, WHOIS may provide a query and response protocol for querying databases that store domain registration related information (e.g., domain registry data). The domain registration related information may comprise one or more of the registration date of the domain name, the expiration date of the domain name, registry ID, and/or the update date of the domain name. WHOIS also allows applications and/or software to query the WHOIS server based on client-server protocols (e.g., the Telnet protocol). In some examples, if receiving email server 140 or cloud server 142 determines that the email domain of an incoming email is not included in the allow list or in the block list, receiving email server 140 may automatically generate queries and submit the queries to the domain name registrar server 150 for obtaining the registration date of the email domain without any user input.

Receiving email server 140 may also communicate with a cloud server (e.g., cloud server 142) for the query of the registration date of the email domain. The cloud server may receive one or more query requests from receiving email server 140 and execute the query requests in real-time. The cloud server may also wait until a batch of query requests are received and execute the received batch of query requests at one time.

Additionally or alternatively, receiving email server 140 may also query a plurality of domain name registrar servers at the same time for incoming emails. As an example, some domain names may be registered in one domain name registrar server, but not in another domain name registrar server. Therefore, receiving email server 140 may need to query more than one domain name registrar server to obtain the registration date of the email domain. As another example, if receiving email server 140 receives a plurality of emails during a time period (e.g., 1 second, 5 seconds), receiving email server 140 may group the plurality of emails based on the similarities of domain names and may then query one of the domain name registrar servers for each group of emails. In some examples, if multiple emails that are associated with the same domain name are received during a short period of time, the domain name may be queried only once.

At step 217, receiving email server 140 may receive the registration date of the email domain from domain name registrar server 150. For example, receiving email server 140 may receive a response to the query for the registration date. Receiving email server 140 may then store the registration date of the email domain in a database (e.g., email storage database 127).

At step 218, receiving email server 140 may compare the registration date of the email domain to a first threshold date. The first threshold date may be a predetermined period of time prior to a current date, such as 180 days before the current date (e.g., the date that the email was received by receiving email server 140). The period of time may be longer than 180 days (e.g., 240 days, 365 days, or the like) or shorter (e.g., 15 days, 30 days, 90 days, or the like) without departing from the invention. In addition, the first threshold date may be part of a security risk model executed by receiving email server 140.

At step 219, receiving email server 140 may determine that the registration date of the email domain is before the first threshold date. If receiving email server 140 determines the registration date of the email domain to be before the first threshold date, receiving email server 140 may determine that the email domain can be trusted.

At step 220, receiving email server 140 may allow delivery of the email to one of the corresponding user devices 160A-160N. For example, receiving email server 140 may allow the recipient identified in the email to download the email stored in receiving email server 140. No warnings may be displayed on a user interface associated with the one of the corresponding user devices 160A-160N.

Figure 2C:
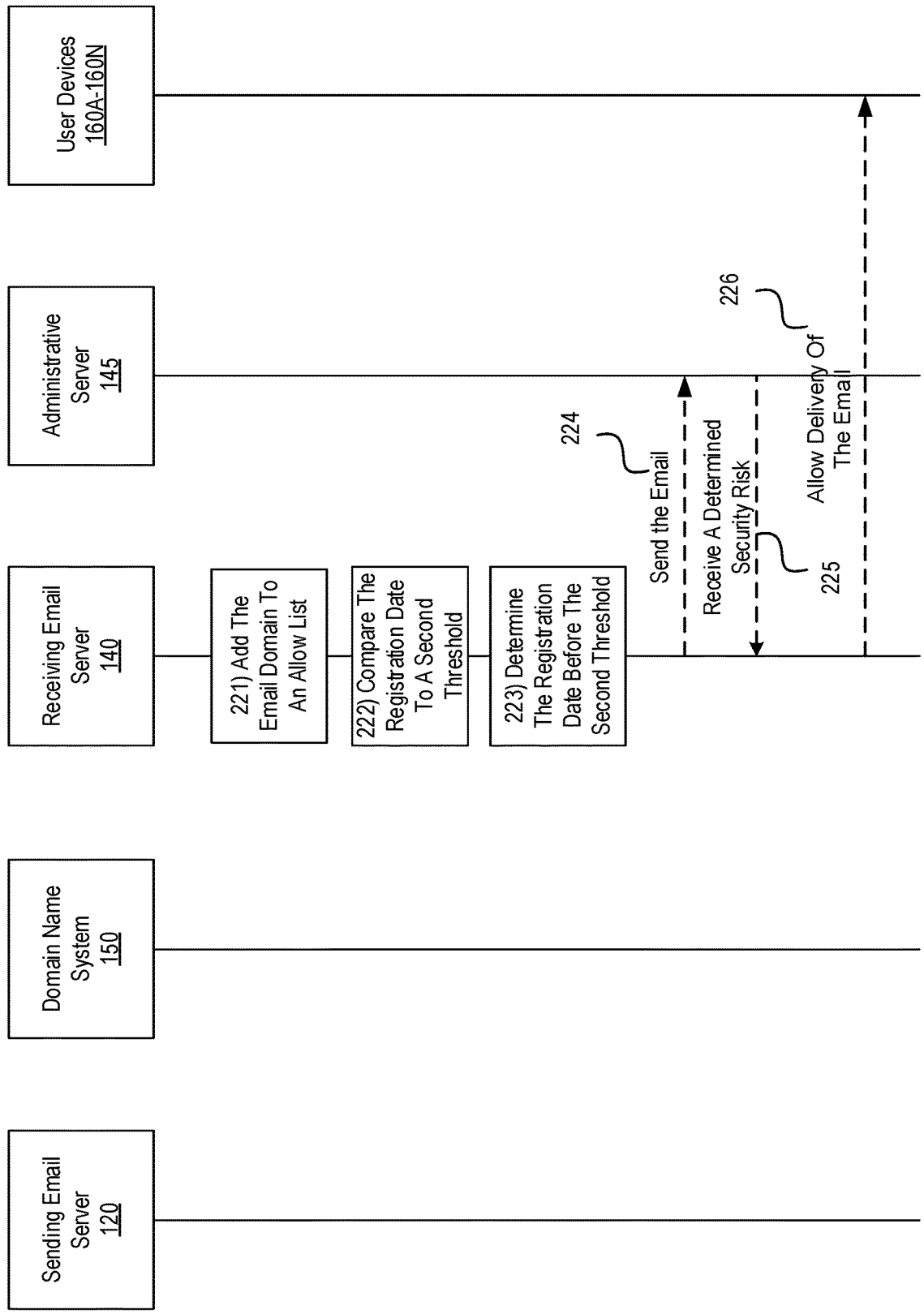

Referring to FIG. 2C, at step 221, receiving email server 140 may add the email domain to the allow list. In this way, any future incoming emails associated with the email domain may be automatically delivered to the recipient without any intervention from receiving email server 140. In some examples, while the email may be delivered, the email domain may be added to the allow list if it includes other qualifying criteria in addition to having an email domain registration date before the first threshold date.

At step 222, if receiving email server 140 determines the registration date of the email domain is at or after the first threshold date, receiving email server 140 may further compare the registration date of the email domain to a second threshold date. The second threshold date may be later (e.g. more recent) than the first threshold date. For example, if the first threshold date is 180 days before the current date, the second threshold date may be a predetermined date such as 90 days before the current date. In addition, the second threshold date may be part of the security risk model executed by receiving email server 140. At step 223, if receiving email server 140 determines the registration date of the email domain to be before the second threshold date and after the first threshold date, further processing on the email may be needed to determine the security risk of the email.

For example, at step 224, receiving email server 140 may send the email to administrative server 141. At this stage, receiving email server 140 might not allow the email to be delivered to the recipient. Instead, receiving email server 140 may allow the email to be delivered to only administrative server 141 for further processing of the email.

At step 225, administrative server 141 may determine the security risk of the email. One or more methods may be used to determine the security risk of the email. For example, an administrator (e.g., a network administrator of a company) may manually examine the email domain and/or the content of the email to determine the security risk of the email. Based on the determined security risk of the email, the administrator may send a message to receiving email server 140 to perform step 224, flag the email with one or more warnings, or perform step 227.

Additionally or alternatively, anti-spam techniques such as machine-learning based techniques may be used to determine the security risk of the email. For example, administrative server 141 may apply trained neural networks to the content of the email and determine the frequency of certain words or phrases in the email. Based on the frequency of certain words or phrases in the email, administrative server 141 may determine the security risk of the email.

Additionally or alternatively, the IP addresses of one or more incoming email network connections (e.g., sending computing device 110, sending email server 120) may be determined via the query of the DNS. For example, when receiving email server 140 queries domain name registrar server 150 for the registration date of the email domain, receiving email server 140 may also query the DNS for the IP addresses of one or more incoming email network connections. In this way, receiving email server 140 may receive one or more responses indicating both the registration date of the email domain and the IP addresses of one or more incoming email network connections. Administrative server 141 or receiving email server 140 may further determine whether the IP address is on one or more block lists of IP addresses. The block lists of IP addresses may be DNS-based block lists that comprise a plurality of IP addresses known to send spam or phishing emails. Different DNS-based block lists may determine the list of the IP addresses based on different policies and/or criteria. Administrative server 141 or receiving email server 140 may choose one or more block lists of IP addresses based on its preferred policies and/or criteria. For example, administrative server 141 or receiving email server 140 may check the IP address of the one or more incoming email network connections against a block list that lists IP addresses known to send spam or phishing emails. Additionally or alternatively, administrative server 141 or receiving email server 140 may check the IP address of the one or more incoming email network connections against a block list that lists IP addresses associated with open-relay servers.

Based on one or more of the determination of the validity of the IP address and/or the registration date of the domain name, receiving email server 140 may determine the security risk of the incoming email. The security risk of the email may be indicated by a score determined by receiving email server 140 and/or administrative server 141. Based on the determined score of the email (e.g., a high score, a low score), receiving email server 140 may determine appropriate actions on the email. For example, if the determined score of the email is high, receiving email server 140 may determine that the email can be trusted. At step 226, receiving email server 140 may allow the delivery of the email to one of the corresponding user devices 160A-160N. However, if receiving email server 140 determines that the email cannot be fully trusted based on the score, receiving email server 140 may choose to block the email (e.g., prevent the email from being delivered to the recipient). Additionally or alternatively, receiving email server 140 may choose to still allow the delivery of the email to one of the corresponding user devices 160A-160N, but receiving email server 140 may remove the attachment or links associated with the email and/or flag the email by, for example, outputting of a warning on the one of the corresponding user devices 160A-160N.

Figure 3:
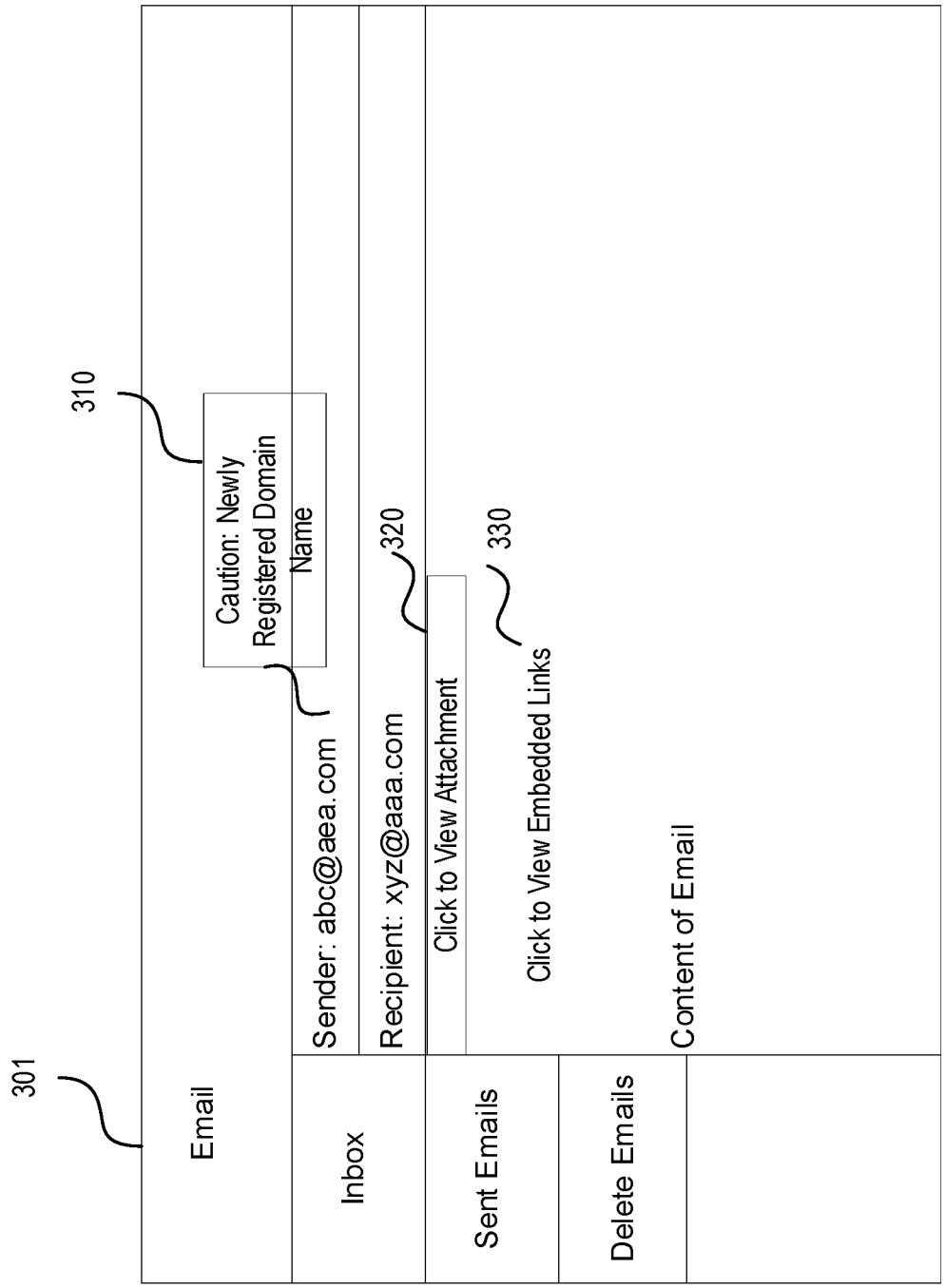
FIG. 3 depicts an example user interface associated with an incoming email in accordance with one or more example embodiments.

For example, FIG. 3 depicts an example user interface associated with an incoming email in accordance with one or more example embodiments. In FIG. 3, an example email user interface 301 may comprise the sender's address and the recipient's address. Example email user interface 301 may further comprise a warning 310 that indicates the received email is associated with a newly registered domain name. Additionally or alternatively, warning 310 may indicate that the received email may be a spam or phishing email. In some embodiments, warning 310 may be a pop-up notification that can be closed by the user of one of the corresponding user devices 160A-160N.

Example email user interface 301 may also comprise a message box 320 that indicates that the attachment to the email can be viewed upon clicking on message box 320. Similarly, example email user interface 301 may also comprise a message box 330 that indicates that the links embedded in the email can be viewed upon clicking on message box 330. In this way, the user may need to perform an additional action before viewing any attachment or links. Alternatively, message box 320 and/or message box 330 may indicate that the attachment and/or links have been removed for security reasons and may allow the user to contact a network administrator if the user would like to view the attachment and/or links. Different types of layouts of warning 310, message box 320, and/or message box 330 may also or alternatively be presented on the user interface. The user interface depicted in FIG. 3 may have different appearances from those shown in the figure herein, depending upon the implementations thereof.

Referring to FIG. 2D, at step 227, if receiving email server 140 determines that the email can be trusted, receiving email server 140 may add the email domain to the allow list. At 228, receiving email server 140 may determine that the registration date of the email domain is at or after the second threshold date. Receiving email server 140 may determine that the email domain is a newly registered domain and may inherently involve a high security risk. Because malicious actors often establish a new email domain that looks like a legitimate business name, the registration date may be close to the date of the emails being received. For example, the registration date of the domain name may be within 30 days of sending emails using the registered domain name to take advantage of the free trial service offered by, for example, domain name registrar 150. The lack of maturity associated with the domain name may indicate possible malicious intent. Therefore, at step 229, receiving email server 140 may block the email. At step 230, receiving email server 140 may add the email domain to the block list. In this way, any future incoming emails associated with the email domain may be automatically blocked without any intervention from receiving email server 140.

Additional threshold dates may be determined and compared with the registration date of the email domain to further determine the security risk of the email. For example, the registration date of the email domain may be compared with a third threshold date. The third threshold date may be later (e.g., more recent) than the second threshold date. For example, if the second threshold date is 90 days before the current date, the third threshold date may be 30 days before the current date. If receiving email server 140 determines that the registration date of the email domain is at or after the third threshold date, receiving email server 140 may block the email and add the email domain to the block list. The threshold dates may be part of the security risk model executed by receiving email server 140.

The threshold dates may be updated based on one or more rules and/or policies. As an example, the threshold dates may be updated based on the free trial duration of domain name registration (e.g., 30 days, 60 days). As another example, the threshold dates may be updated based on the user feedback on the validity of the email domains. Users may be allowed to notify receiving email server 140 and/or administrative server 141 of whether the allowed, blocked, or flagged emails are suspicious emails. Based on the user feedback, receiving email server 140 may adjust the threshold dates to better match the user's expectations. Machine learning based techniques may be used to adjust the threshold dates based on the user feedback. For example, receiving email server 140 may train a threshold date model (e.g., a decision tree model) based on user feedback data.

Additionally or alternatively, the threshold dates may be updated based on the frequency of receiving emails associated with newly registered domain names. For example, if receiving email server 140 receives a larger amount of emails associated with newly registered domain names (e.g., registered within 90 days of receiving the emails) during a period of time (e.g., one day, one week, one month), receiving email server 140 may adjust the threshold dates to be closer to the date that the emails were received so that fewer emails may be blocked.

Figure 4:
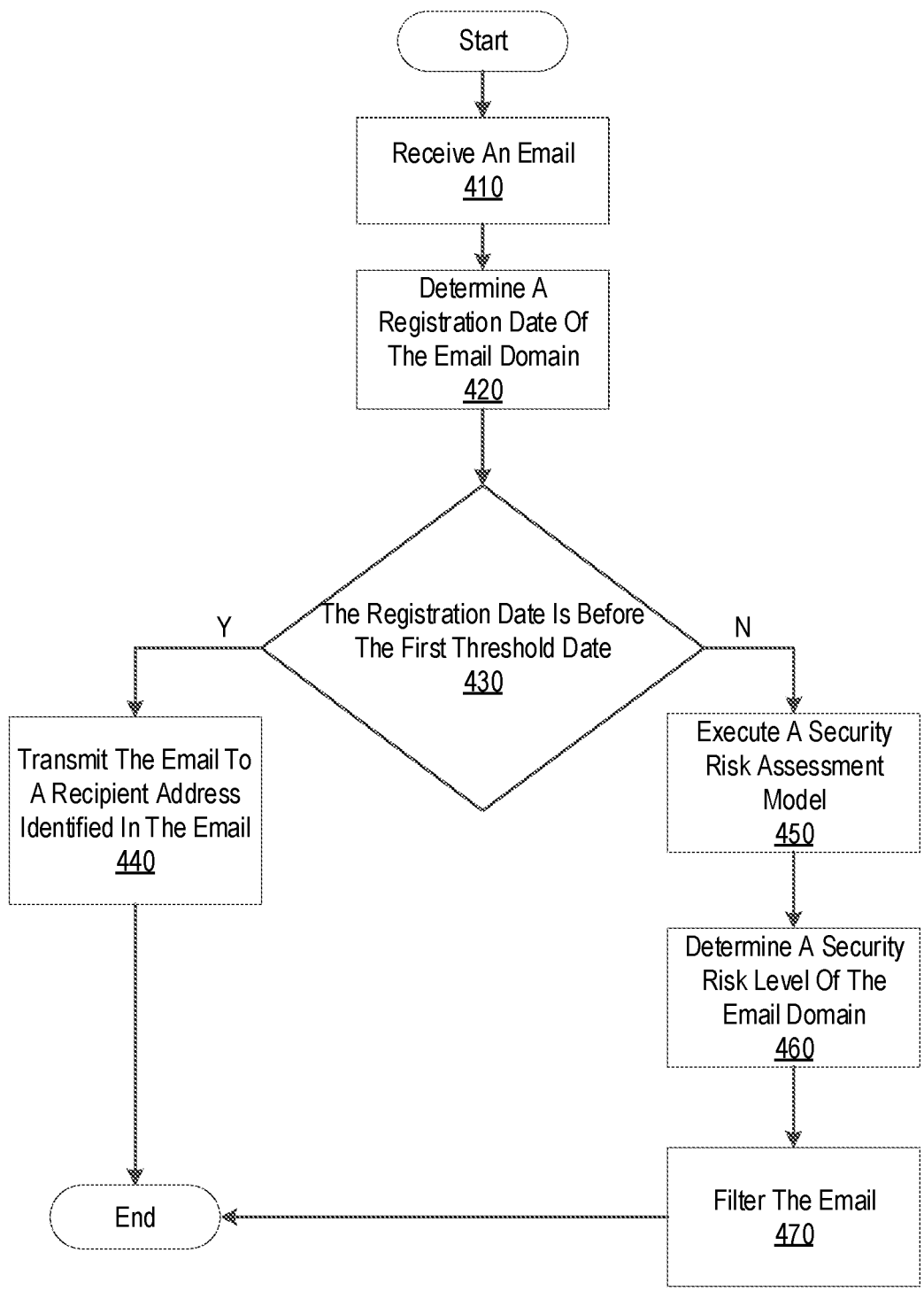
FIG. 4 depicts an illustrative method for identifying and processing suspicious emails based on email domains and/or email domain date in accordance with one or more example embodiments.

FIG. 4 depicts an illustrative method for identifying and processing suspicious emails in accordance with one or more example embodiments. Referring to FIG. 4, at step 410, a computing device (e.g., receiving email server 140) having at least one processor, a communication interface, and memory may receive an email. At step 420, the computing device may determine a registration date of an email domain associated with the email. The determination of the registration date of the email domain may be performed upon receiving the email. The determination of the registration date of the email domain may comprise querying a domain name registrar (e.g., domain name registrar server 150) and receiving a response indicating the registration date from the domain name registrar. At step 430, the computing device may determine whether the determined registration date is before the first threshold date. For example, the computing device may compare the determined registration date with the first threshold date. At step 440, in response to a determination that the determined registration date is before the first threshold date, the computing device may transmit the email to a recipient address identified in the email. In this case, the computing device may determine that the email is from a trusted source. At step 450, in response to a determination that the determined registration date is at or after the first threshold date, the computing device may execute a security risk assessment model. The security risk assessment model may comprise one or more threshold dates and the registration date of the email may be compared to the one or more threshold dates to determine a security risk (e.g., a score indicating the security risk) of the email. The security risk assessment model may comprise information indicating a relation between the registration date and the security risk level of the email domain. For example, an early registration date (e.g., the registration date is before the first threshold date) may correspond to a low security risk level and a more recent registration date (e.g., the registration date is after the first threshold date) may correspond to a higher security risk level. At step 460, the computing device may determine a security risk level of the email domain. For example, the computing device may send (e.g., redirect) the email to an administrator email address for further determination of the security risk of the email. Additionally or alternatively, other techniques may be used to determine the security risk of the email. At step 470, the computing device may filter the email based on the determined security risk level of the email domain. As an example, the filtering the email may comprise preventing the email from being transmitted to the recipient address identified in the email. As another example, the filtering the email may comprise flagging the email as suspicious and allowing the delivery of the email to the recipient address identified in the email. As another example, the filtering the email may comprise removing the attachment to the email and the links contained in the email before transmitting the email to the recipient address identified in the email.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   receiving, by a computing device having a processor and memory, an email associated with an email domain;
   determining, by the computing device, a registration date of the email domain;
   comparing, by the computing device, the determined registration date to a first threshold date;
   responsive to determining that the determined registration date is before the first threshold date, transmitting, by the computing device, the email to a recipient address identified in the email;
   responsive to determining that the determined registration date is at or after the first threshold date, executing, by the computing device, a security risk assessment model, wherein the security risk assessment model comprises a second threshold date, and wherein the second threshold date is later than the first threshold date;
   responsive to determining whether the determined registration date is at or after the second threshold date, determining, by the computing device, a security risk level of the email domain;
   filtering, by the computing device and based on the security risk level of the email domain, the email; and
   updating, based on a quantity of emails prevented from being transmitted to recipient addresses during a time period, the first threshold date and the second threshold date.

2. The method of claim 1, wherein the security risk assessment model comprises information indicating a relation between the registration date and the security risk level of the email domain.

3. The method of claim 1, wherein the filtering the email comprises:
   preventing the email from being transmitted to the recipient address identified in the email.

4. The method of claim 1, wherein the filtering the email comprises:
   redirecting, based on the security risk level of the email domain, the email to an administrator email address for further determination of a security risk of the email; and
   responsive to determining that the email is associated with a low security risk, allowing delivery of the email to the recipient address identified in the email.

5. The method of claim 1, further comprising:
   adding, based on the security risk level of the email domain, the email domain to a block list; and
   automatically blocking emails associated email domains included in the block list.

6. The method of claim 1, wherein determining the registration date of the email domain comprises:
   querying a domain name registrar for the registration date of the email domain; and
   receiving the registration date of the email domain from the domain name registrar.

7. The method of claim 1, further comprising:
   determining that the determined registration date is after the first threshold date and before the second threshold date, wherein the filtering comprises:
   based on the determining that the determined registration date is after the first threshold date and before the second threshold date:
   generating a notification indicating that the email is suspicious; and
   allowing delivery of the email to the recipient address identified in the email.

8. The method of claim 1, further comprising:
   generating, based on the security risk level of the email domain, an alert on a user interface indicating that the email domain is a newly registered email domain.

9. The method of claim 1, further comprising:
   receiving, from a user device, a message associated with the security risk level of the email domain, wherein the updating the first threshold date and the second threshold date is further based on the message associated with the security risk level of the email domain.

10. An apparatus, comprising:
    at least one processor;
    memory storing computer-readable instructions that, when executed by the at least one processor, cause the apparatus to:
    receive an email associated with an email domain;
    determine a registration date of the email domain;
    compare the determined registration date to a first threshold date;
    responsive to determining that the determined registration date is before the first threshold date, transmit the email to a recipient address identified in the email;

responsive to determining that the determined registration date is at or after the first threshold date, execute a security risk assessment model, wherein the security risk assessment model comprises a second threshold date, and wherein the second threshold date is later than the first threshold date;

responsive to determining whether the determined registration date is at or after the second threshold date, determine a security risk level of the email domain;

filter, based on the security risk level of the email domain, the email; and update, based on a quantity of emails prevented from being transmitted to recipient addresses during a time period, the first threshold date and the second threshold date.

11. The apparatus of claim 10, wherein the security risk assessment model comprises information indicating a relation between the registration date and the security risk level of the email domain.

12. The apparatus of claim 10, wherein the instructions, when executed by the at least one processor, cause the apparatus to:

prevent the email from being transmitted to the recipient address identified in the email.

13. The apparatus of claim 10, wherein the instructions, when executed by the at least one processor, cause the apparatus to:

redirect, based on the security risk level of the email domain, the email to an administrator email address for further determination of a security risk of the email; and responsive to determining that the email is associated with a low security risk, allow delivery of the email to the recipient address identified in the email.

14. The apparatus of claim 10, wherein the instructions, when executed by the at least one processor, cause the apparatus to:

add, based on the security risk level of the email domain, the email domain to a block list; and automatically block emails associated email domains included in the block list.

15. The apparatus of claim 10, wherein the instructions, when executed by the at least one processor, cause the apparatus to:

query a domain name registrar for the registration date of the email domain; and receive the registration date of the email domain from the domain name registrar.

16. One or more non-transitory computer-readable media storing instructions that, when executed by one or more processors, cause:

receiving an email associated with an email domain;

determining a registration date of the email domain;

comparing the determined registration date to a first threshold date;

responsive to determining that the determined registration date is before the first threshold date, transmitting the email to a recipient address identified in the email;

responsive to determining that the determined registration date is at or after the first threshold date, executing a security risk assessment model, wherein the security risk assessment model comprises a second threshold date, and wherein the second threshold date is later than the first threshold date;

responsive to determining whether the determined registration date is at or after the second threshold date, determining a security risk level of the email domain;

filtering, based on the security risk level of the email domain, the email; and updating, based on a quantity of emails prevented from being transmitted to recipient addresses during a time period, the first threshold date and the second threshold date.

17. The one or more non-transitory computer-readable media of claim 16, wherein the instructions, when executed by the one or more processors, further cause:

preventing the email from being transmitted to the recipient address identified in the email.

18. The one or more non-transitory computer-readable media of claim 16, wherein the instructions, when executed by the one or more processors, further cause:

redirecting, based on the security risk level of the email domain, the email to an administrator email address for further determination of a security risk of the email; and responsive to determining that the email is associated with a low security risk, allowing delivery of the email to a recipient address identified in the email.

19. The one or more non-transitory computer-readable media of claim 16, wherein the instructions, when executed by the one or more processors, further cause:

adding, based on the security risk level of the email domain, the email domain to a block list; and automatically blocking emails associated email domains included in the block list.

20. The one or more non-transitory computer-readable media of claim 16, wherein the instructions, when executed by the one or more processors, further cause:

querying a domain name registrar for the registration date of the email domain; and receiving the registration date of the email domain from the domain name registrar.

* * * * *